(12) United States Patent
Caglioni et al.

(10) Patent No.: US 12,092,509 B2
(45) Date of Patent: Sep. 17, 2024

(54) SAMPLE-HANDLING-MODULE AND APPARATUS FOR CALIBRATING A MULTI-CHANNEL LIQUID HANDLING DEVICE

(71) Applicant: Mettler-Toledo GmbH, Greifensee (CH)

(72) Inventors: Louis Caglioni, Nuerensdorf (CH); Marc Zehnder, Uster (CH)

(73) Assignee: Mettler-Toledo GmbH, Greifensee (CH)

( * ) Notice: Subject to any disclaimer, the term of this patent is extended or adjusted under 35 U.S.C. 154(b) by 403 days.

(21) Appl. No.: 17/644,595

(22) Filed: Dec. 16, 2021

(65) Prior Publication Data
US 2022/0196458 A1      Jun. 23, 2022

(30) Foreign Application Priority Data
Dec. 18, 2020   (EP) .................................... 20215544

(51) Int. Cl.
| | |
|---|---|
| G01G 17/04 | (2006.01) |
| G01G 19/52 | (2006.01) |
| G01G 21/22 | (2006.01) |
| G01G 21/23 | (2006.01) |
| G01N 35/00 | (2006.01) |
| G01N 35/10 | (2006.01) |

(52) U.S. Cl.
CPC ............ *G01G 17/04* (2013.01); *G01G 21/23* (2013.01); *G01G 19/52* (2013.01); *G01G 21/22* (2013.01); *G01N 35/00693* (2013.01); *G01N 35/1065* (2013.01)

(58) Field of Classification Search
CPC ........ G01G 17/04; G01G 19/52; G01G 21/22; G01G 21/23; G01N 35/00693; G01N 35/1065; G01N 2035/00217
USPC ........................................................... 73/296
See application file for complete search history.

(56) References Cited

U.S. PATENT DOCUMENTS 6,804,985 B2    10/2004   Luchinger

FOREIGN PATENT DOCUMENTS

| CN | 217570058 U | * | 10/2022 | |
| CN | 108695201 B | * | 8/2023 | .............. G01F 11/00 |

(Continued)

*Primary Examiner* — Peter J MacChiarolo
*Assistant Examiner* — Monica S Young
(74) *Attorney, Agent, or Firm* — Standley Law Group LLP; Jeffrey S. Standley; Adam J. Smith

(57) ABSTRACT

A sample-handling-module (10) and an apparatus (1) for calibrating a multi-channel liquid handling device are disclosed. The sample-handling-module cooperates with a weighing balance (11) with a load receiver (16). The sample-handling module has a holding device (20) with holders (22), arranged sequentially and equally spaced apart, configured to receive receptacles (26). A supporting device (30) has an array of tines (32) to laterally support the holders when the holders dismount from the load receiver. An actuating device (44) is operatively connected to the holders through the array of tines. The actuating device mounts the holders onto the load receiver, one at a time, by disengaging the corresponding tines. A system and a method of operating the actuating device are also disclosed. The sample-handling-module of the present invention is modular and compact thus making it easier to manufacture, operate, repair, and service.

14 Claims, 9 Drawing Sheets

(56) References Cited

FOREIGN PATENT DOCUMENTS

| EP | 1698872 A1 | * | 9/2006 | ............ | G01G 21/244 |
| EP | 2759816 A1 | * | 7/2014 | ............. | G01F 13/00 |

\* cited by examiner

SAMPLE-HANDLING-MODULE AND APPARATUS FOR CALIBRATING A MULTI-CHANNEL LIQUID HANDLING DEVICE

CROSS-REFERENCE TO RELATED APPLICATIONS

This patent application claims priority to European application 20215544.6, which was filed on 18 Dec. 2020 and which is incorporated by reference as if fully recited herein.

TECHNICAL FIELD

The disclosed inventive concept to calibration of a multi-channel liquid handling device such as a pipette, and more specifically it relates to a sample-handling-module cooperating with a weighing device for gravimetrically calibrating a multi-channel liquid handling device.

BACKGROUND ART

Pipettes are liquid handling instruments used in laboratories for transferring predefined volumes of test liquids. Several analytical routines in laboratory environment involve dispensing of liquids using pipettes. Multi-channel pipettes are efficient laboratory tools, because they allow liquid to be aspirated simultaneously from one or more containers and to be dispensed into several target vessels, instantly. When a multi-channel pipette is in use, the amount of liquid aspirated and dispensed should be the same in all channels. Pipettes, particularly, multi-channel pipettes, employed for analytical procedures must transfer accurate amounts of liquid during every single pipetting cycle. This requirement makes it imperative to periodically test a multi-channel pipette, and ensure that its performance is well within the tolerances prescribed for a given application. This periodic testing and verification of a pipette's performance is termed as calibration.

The calibration procedures used for verifying a pipette's performance generally vary depending on the use case or application requirements. A multi-channel pipette that is used for training students in a chemistry laboratory only requires basic calibration fulfilling broader specifications. However, regulated laboratories that are subjected to regular audits under Good Laboratory Practices require statistical analysis of test data supporting the pass/fail status of a pipette. Such regulated laboratories strictly follow procedures prescribed under Part 6 of ISO 8655 for determining measurement errors in pipetting apparatus using gravimetric methods.

Calibrating pipettes at regular intervals ensures higher reproducibility of results in a standard analytical procedure. However, determining a calibration interval is largely driven by frequency and intensity of pipette use, ageing of pipetting instrument, skill and training levels of the operator, type of liquid dispensed by the pipettes, and the accuracy demanded by a given laboratory procedure. Gravimetric analysis is a widely used method for pipette calibration due to the simplicity and economical nature of the procedure. The gravimetric approach utilizes the known density of water under standard conditions of temperature, pressure, and humidity. The weight value of dispensed sample measured by a weighing balance is indicative of the volume dispensed by the pipetting instrument. Based on the results obtained from gravimetric analysis, the pipettes are tuned using the tool(s) provided by the manufacturer. The gravimetric analysis and calibration of the pipette is repeated until the computed measurement error is well within the desired tolerance limit.

A well calibrated multi-channel pipette is an indispensable instrument for high through-put, high-accuracy laboratory applications. Calibrating a multi-channel pipette entails verifying each channel separately for its accuracy. However, the primary issue with calibrating a multi-channel pipette is the high number of pipetting cycles and corresponding weighing events that are required to be carried out. For example, calibrating a 12 channel pipette to obtain UKAS accreditation requires 360 weighing events (3 volumes×10 repetitions×12 channels). A robust apparatus is necessary for calibrating a multi-channel pipette faster without compromising the accuracy.

One such apparatus for gravimetrically calibrating a multi-channel pipette is described in commonly-owned U.S. Pat. No. 6,804,985 B2. The apparatus is provided with a transport device that advances the receptacles to the load receiver of a weighing device. This prior solution strives to solve the problem of using dedicated load cells for each receptacle in the process of gravimetrically calibrating a multi-channel pipette. The prior solution primarily focuses on employing a single load cell and equipping the apparatus with a transport device to deliver the receptacles one by one to the load receiver. As one receptacle is removed from the load receiver, a next following receptacle is delivered to the measuring device thus avoiding the use of multiple load cells for calibrating a single multi-channel pipette. The transport device in the prior solution is designed to perform a combined movement where the holder device carrying the receptacles is moved horizontally forward or backward while being simultaneously raised and lowered. The transport device contains several components such as a carriage, channel, rack, a drive wheel with bolts or rollers etc., which move relative to another component. The holder device when subjected to a combined movement during operation of the apparatus induces vibrations that adversely affect load cell performance. The main design aspect of the prior art apparatus is the travelling feature. The prior art apparatus creates a large foot-print during its installation and operation, particularly due to its travelling feature, thus occupying valuable laboratory space. In view of the aforementioned problems associated with prior calibration apparatus, a new solution is devised by the applicant for efficiently performing multi-channel pipette calibration. The proposed solution does not involve combined movement of holders i.e. it does not use the travelling feature. The inventive solution benefits the users through its compactness, modular implementation, and smooth functioning.

SUMMARY OF INVENTION

The object of the present invention is to provide a sample-handling-module cooperating with a load receiver of a weighing device for calibrating a multi-channel liquid handling device. Accordingly, the sample-handling-module comprises: a holding device having holders arranged sequentially and spaced apart equally from each other and configured to receive receptacles. The sample-handling-module is characterized by a supporting device comprising an array of tines providing lateral support to the holders when the holders dismount from the load receiver; and an actuating device operatively connected to the holders through the array of tines, wherein the actuating device is operable to mount the holders on to the load receiver, one at a time, by disengaging the corresponding tines supporting said holder. The sample-handling-module of the present invention is modular and compact thus making it easier to manufacture, operate, repair, and service. The actuating device together with the supporting device enables smooth and seamless mounting and dismounting of the holders on to and from the load receiver of the weighing balance. The sample-handling-module operates from a fixed location and does not involve any back-and-forth movement thus eliminating unwanted vibrations that could potentially affect the performance of the weighing device.

Advantageously, each tine in the array of tines is configured as a pliable finger comprising an immovable fixed-end, a free-end, and a contacting portion located in between the fixed-end and the free-end. Each array of tines is formed from a single metal sheet thus making it an integrated component. The fixed-ends of all tines in the array of tines remain integrated at all times. The fixed-ends absorbs moment generated within the tine besides resisting any other force that would distort the alignment and configuration of the tines within the array. The free-end carries the holder and also helps in connecting the supporting device to the holding device, when the given holder remains dismounted from the load receiver. The contacting portion maintains surface to surface contact with the actuating device at all times thereby induces deflection in the tine, which in turn leads to mounting and dismounting of the holder on to and from the load receiver, respectively.

Preferably, the free-end of each tine extends upwardly and comprises a notch for laterally engaging the holders when the holders dismount from the load receiver. The upwardly extension of the free-end maintains spacing between the holder and the load receiver, when the holder is dismounted from the load receiver.

In the sample-handling-module, preferably, the actuating device further comprises a pair of shafts operating in tandem, with each shaft comprising a plurality of eccentric profiles provided along a discontinuous helical pitch. Each shaft supports all the tines through their respective contacting portions. The eccentric profiles on the shafts serve as actuators for inducing deflection in tines, particularly when the contacting portions of the tines interact surface-to-surface with eccentric profiles. Providing eccentric profiles along a discontinuous helical pitch enables the mounting and dismounting of the holders in a consecutive manner thereby bringing order and predictability to the overlying process. One of the shafts further comprises a light-barrier in the form of a ring-like shoulder arranged along the outer circumference of the shaft. The light-barrier aids in determining the operating status or functioning of the actuating device.

In an advantageous embodiment, the eccentric profiles are configured as depressions. An eccentric profile configured as a depression induces the tines to initially deflect downwards, which results in the mounting of the holder on to the load receiver. The same eccentric profile subsequently induces the tines to deflect upwardly, there by dismounting the holder from the load receiver.

According to a preferred embodiment, the shafts are arranged parallel to each other and positioned beneath the array of tines such that the shafts remain in surface-to-surface contact at all times with the contacting portions of the tines. The holders are supported laterally on both the sides with an array of tines each. Hence, each shaft is dedicated to interact with the corresponding array of tines arranged on either side of the holders.

In a preferred embodiment of the present invention, the actuating device comprises a prime-mover such as a motor for providing motive force to drive the shafts. Using a prime-mover allows greater control over rotational direction and speeds of shafts, thus making the sample-handling-module versatile and adaptive to the use cases.

In an advantageous embodiment, the actuating device further comprises drive elements to operate the pair of shafts in tandem upon application of the motive force through the prime-mover. The shafts are operated in tandem, in order to facilitate simultaneous operation of tine-pair on both sides of the holder when contacting portions interact with the eccentric profiles. The tandem operation of shafts ensures even and smoother placement and removal of holders from the load receiver.

Preferably, the holding device further comprises a pair of pins attached laterally to the holder and extending outwardly. Specifically, the pins interact with the load receiver when the holder to which they are attached is mounted on to the load receiver. The pins interact with the notch of the corresponding tines when the corresponding holder to which they are attached is unmounted from the load receiver.

In an advantageous arrangement, the holding device, the supporting device, and the actuating device are enclosed in a housing. The housing acts as a draft shield and a protective structure besides providing an efficient packaging solution for all components of the sample-handling-module. The housing further comprises a base plate attached to a platform of the weighing device. The base plate serves a dual purpose. It acts as a load-bearing surface for all the remaining components of the sample-handling-module. It also helps in aligning the sample-handling-module accurately when positioned on the surface of the weighing platform.

Advantageously, the housing further comprises: longitudinal separators arranged parallel to each other and positioned on either side of the holding device so as to separate the holding device from the actuating device; mounting plates arranged perpendicular to the longitudinal separators for mounting the actuating device; and a top cover having an opening secured with a shutter, and the top cover further comprises evaporation wells. The longitudinal separators isolate the holders from the rotating shafts. The longitudinal separators and the mounting plates together form an enclosing space in which the load receiver of the weighing device is received for interacting with the holders. The load receiver is configured as a winged-frame extending vertically within the aforementioned enclosing space. The longitudinal separators, the mounting plates, and the top cover together shield the test-liquid contained in the receptacles from adverse influences.

In the preferred embodiment, the housing comprises a lower portion located closest to the base plate; a central portion located immediately above the lower portion; and an upper portion located immediately above the middle portion and closest to the top cover. Sensitive electronics for powering and controlling the sample-handling-module are positioned in the lower portion, which has the least exposure to elemental effects. The actuating device is positioned in the middle portion so as to facilitate continuous interaction with supporting device. The actuating device has higher space requirements in order to accommodate its components such as prime-mover, shafts, drive elements etc. The holding device and the supporting device are positioned in the upper portion, where interaction with load receiver occurs.

In a preferred embodiment, an apparatus for calibrating a multi-channel liquid handling device is disclosed. The apparatus comprises: a sample-handling-module and a weighing device cooperating with the sample-handling-module.

In another advantageous embodiment, a system for operating an actuating device of the present invention is disclosed. The system comprises: an actuating device configured to function according to a predetermined operating cycle, wherein the predetermined operating cycle comprises an operational condition and a terminal condition; a communication interface configured to facilitate exchange of signals among various elements within the system; a sensing element configured to: sense the predetermined operating cycle of the actuating device, detect whether the operating cycle has reached a terminal condition, and provide an output signal upon detecting the terminal condition; a processing element configured to process the output signal indicative of the terminating condition and issue a processed signal; an encoding element configured to generate pulses representative of disposition of the actuating device and initiate a reset when the predetermined operating cycle of the actuating device reaches a terminal condition. The actuating device iterates through the predetermined operating cycle until the system is suspended from operating. The system described above provides the necessary framework to control the actuating device according to a predetermined operating cycle.

In a preferred way, a method of operating the actuating device is disclosed. The instant method comprises: operating the actuating device according to the predetermined operating cycle, wherein said predetermined operating cycle comprising the operational condition and the terminal condition; generating pulses representative of disposition of the actuating device using the encoding element; sensing the predetermined operating cycle of the actuating device using the sensing element; exchanging signals among various elements within the system using the communication interface; checking whether the operating cycle has reached a terminal condition as detected by the sensing element; providing the output signal from the sensing element to the processing element upon detecting the terminal condition; processing the output signal received from the sensing element and issuing the processed signal using the processing element; receiving the processed signal from the processing element and resetting the predetermined operating cycle of the actuating device to the operational condition; and initiating a reset of the encoding element; whereby iterating the actuating device through the predetermined operating cycle until the system is suspended from operating.

BRIEF DESCRIPTION OF DRAWINGS

A better understanding of the inventive concept may be had by reviewing the appended drawings that are made a part hereof, wherein identical parts are identified by identical reference numbers and wherein.

DESCRIPTION OF EMBODIMENTS

Figure 1:
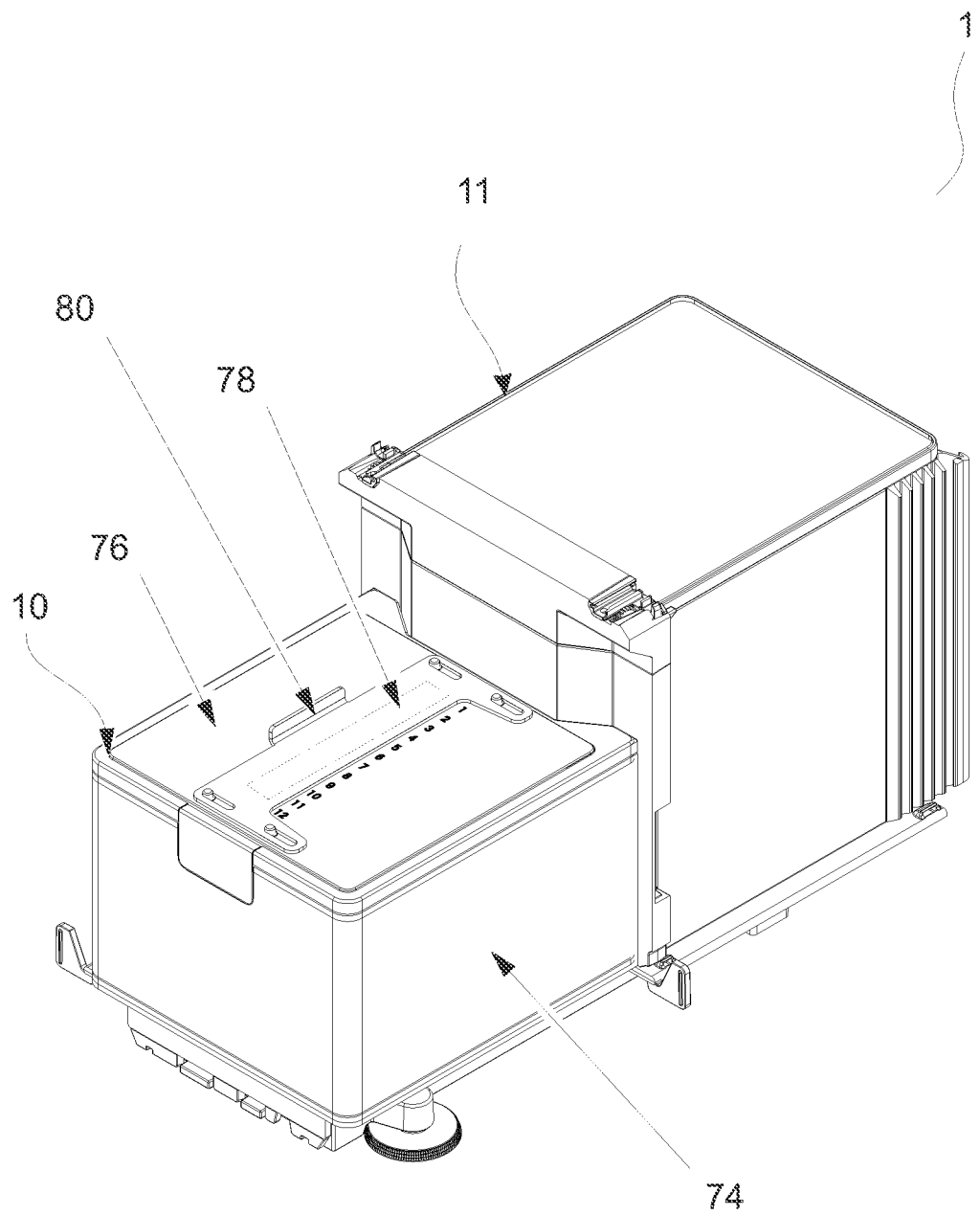
FIG. 1 shows an apparatus for calibrating a multi-channel liquid handling device in a perspective view.

FIG. 1 illustrates an apparatus (1) for calibrating a multi-channel liquid handling device such as a pipette. At a high level, the apparatus comprises a liquid-handling-module (10) and a weighing device (11). The liquid-handling-module (10) is provided with an outer cover (74) and a top cover (76), both of which encase the other working components. The top cover (76) is provided with an opening (78) and access to which is regulated by a shutter (80). As shown in FIG. 1, the shutter (80) is configured to slide back and forth, thus blocking access to the opening (78) in one position and providing access to the opening (78) in the other. An operator gains access to the receptacles (26, not shown in FIG. 1) through the opening (78). Underneath the top cover (76) is a provision to arrange and maintain evaporation wells (not shown) filled with water that serve to contain evaporative losses from the receptacles (26, not shown in FIG. 1). A numerical index (numerals 1 through 12 on 76 in FIG. 1) representative of the number of receptacles that can be housed in the liquid-handling-module (10) is provided on the top cover (76).

Figure 2:
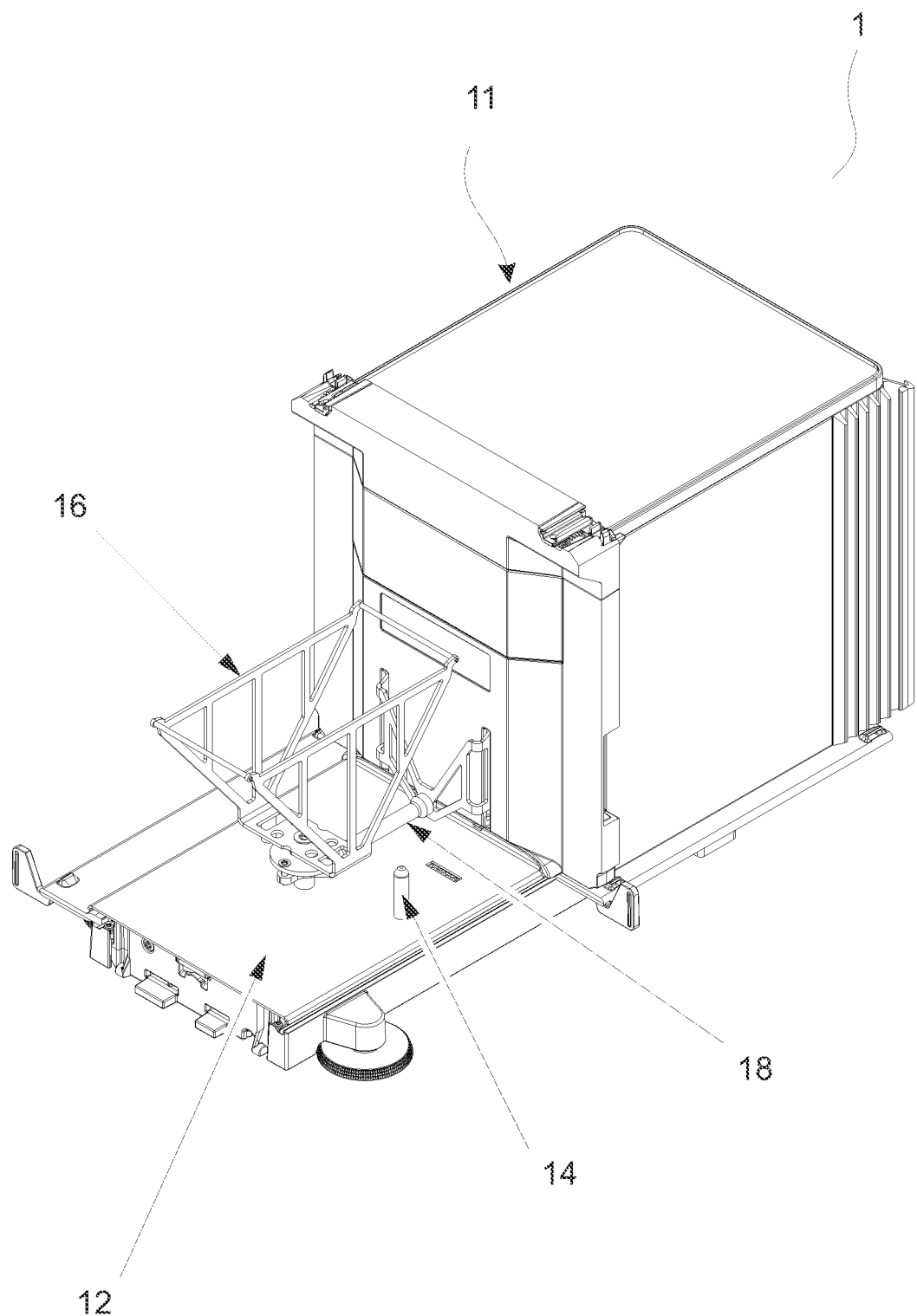
FIG. 2 shows exclusively a weighing device with a load receiver that is part of the apparatus shown in FIG. 1.

FIG. 2 shows the weighing device (11) of the present embodiment by itself. The weighing device (11) of the present invention comprises a platform (12) provided with at least one peg (14) for accurate placement and interlocking of the liquid-handling-module (10). The weighing device (11) is a laboratory balance whose load receiver (16) is specially configured to functionally cooperate with the liquid-handling-module (10). The load receiver (16) is operatively coupled to the load-cell (not shown) of the weighing device (11) through a force transmitting link (18).

Figure 3:
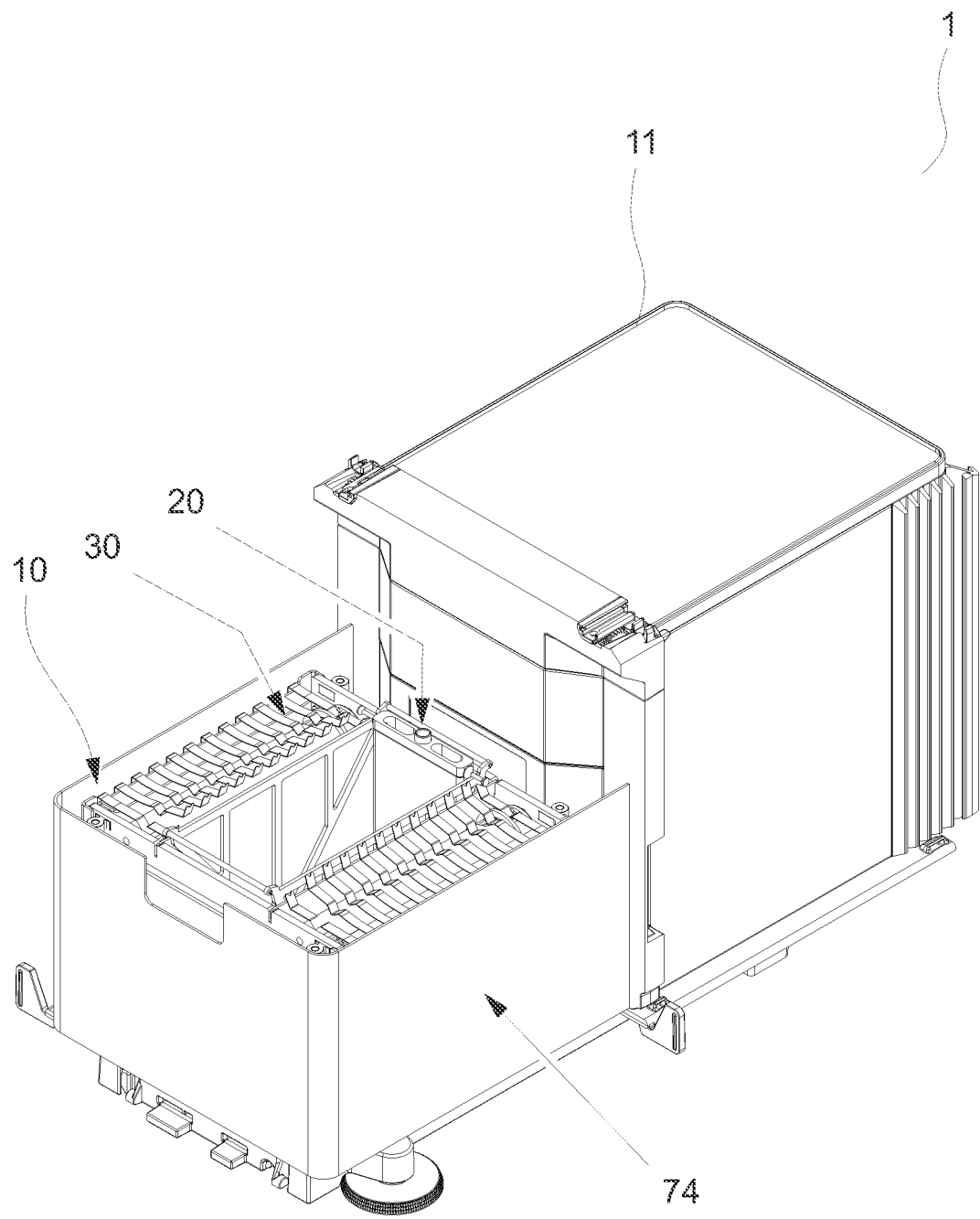
FIG. 3 shows a further representation of the apparatus shown in FIG. 1 after removing the top cover of sample-handling-module.

FIG. 3 shows a further representation of the apparatus (1) shown in FIG. 1 after removing the top cover (76) of sample-handling-module (10). The sample-handling-module (10) comprises a holding device (20) and a supporting device (30). The purpose of the holding device (20) is to receive the receptacles (26) from outside and securely hold them in place within the sample-handling-module (10) besides facilitating interaction between the sample-handling-module (10) and the weighing balance (11). When not interacting with the weighing balance (11), the holding device (20) interacts with the supporting device (30). The constituents of supporting device (30) are explained in the next paragraph by referencing FIG. 4. The interactivity between the holding device (20) and the supporting device (30) will be explained further in detail in the ensuing paragraphs when FIGS. 6A-6B are referenced.

Figure 4:
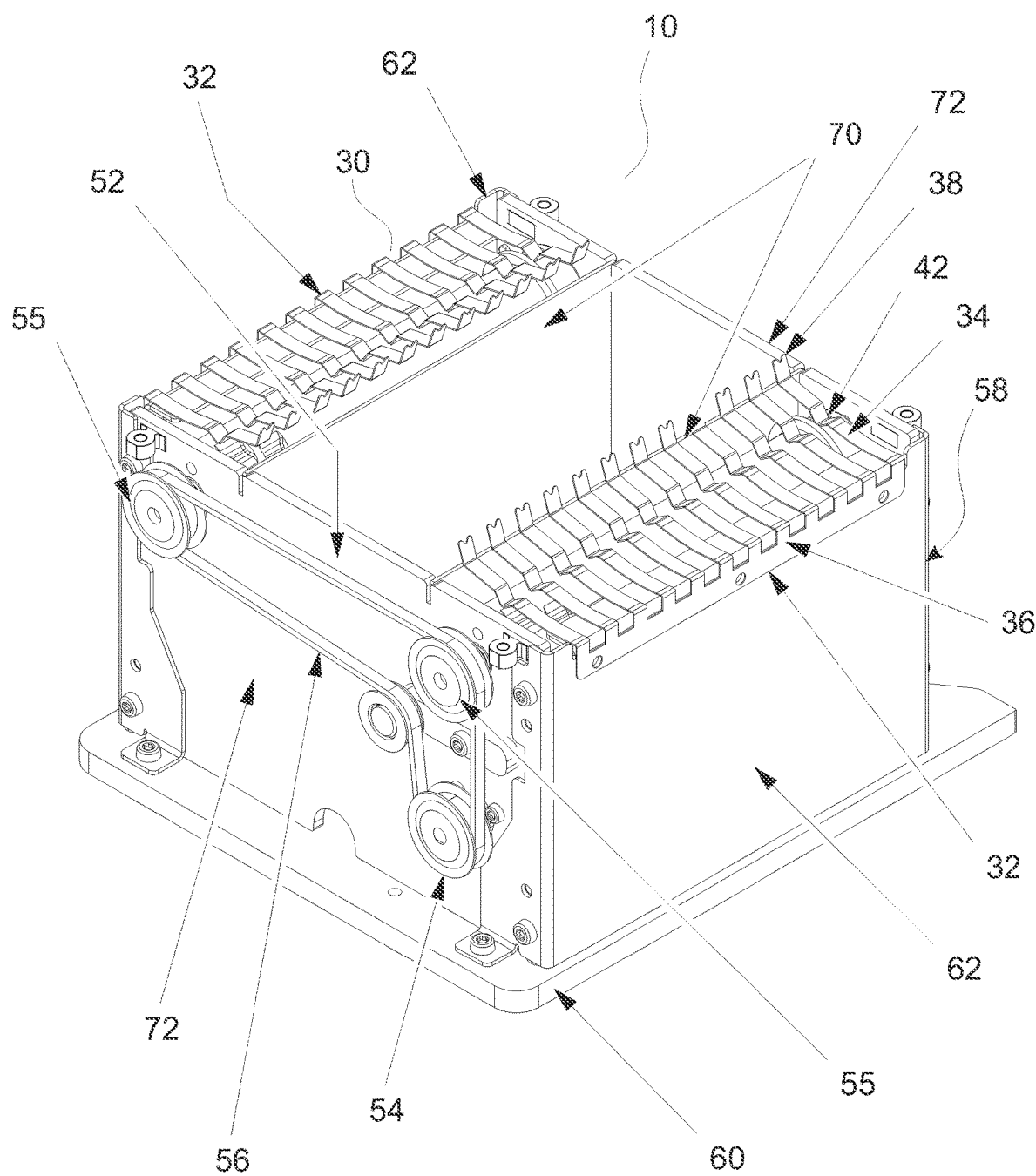
FIG. 4 shows the sample-handling-module after stripping off the outer cover for the purpose of indicating supporting device and actuating device.

FIG. 4 shows a standalone sample-handling-module (10) after stripping off the outer cover (74), top cover (76), and the holding device (20) from the modular assembly for the purpose of indicating certain aspects of the supporting device (30) and actuating device (44). The supporting device (30) comprises an array of tines (32) configured to provide lateral support to the holding device (20). Each tine (34) in the array of tines (32) is configured as a finger having an immovable fixed end (36), a free end (38), and a contacting portion (42). The supporting device (30) is envisaged to be operated by an actuating device (44, not indicated in FIG. 4). The drive pulley (54), the driven pulleys (55, 55), and the unending belt (56) together constitutes the drive elements (52) of the actuating device (44). The holding device (20), the supporting device (30), and the actuating device (44) are enclosed in a housing (58). Housing (58) comprises a base plate (60) attachable to the platform (12) of the weighing device (11). Housing (58) is envisaged to further comprise longitudinal separators (70), mounting plates (72), and top cover (76). Longitudinal separators (70) are arranged parallel to each other and positioned immediately on either side of the holding device (20) so as to separate the holding device (20) from the actuating device (44). Mounting plates (72) are arranged perpendicular to the longitudinal separators (70) for mounting the actuating device (44). The longitudinal separators (70), the mounting plates (72), and the top cover (76) together shield the test-liquid contained in the receptacles (26) from adverse influences.

Figure 5:
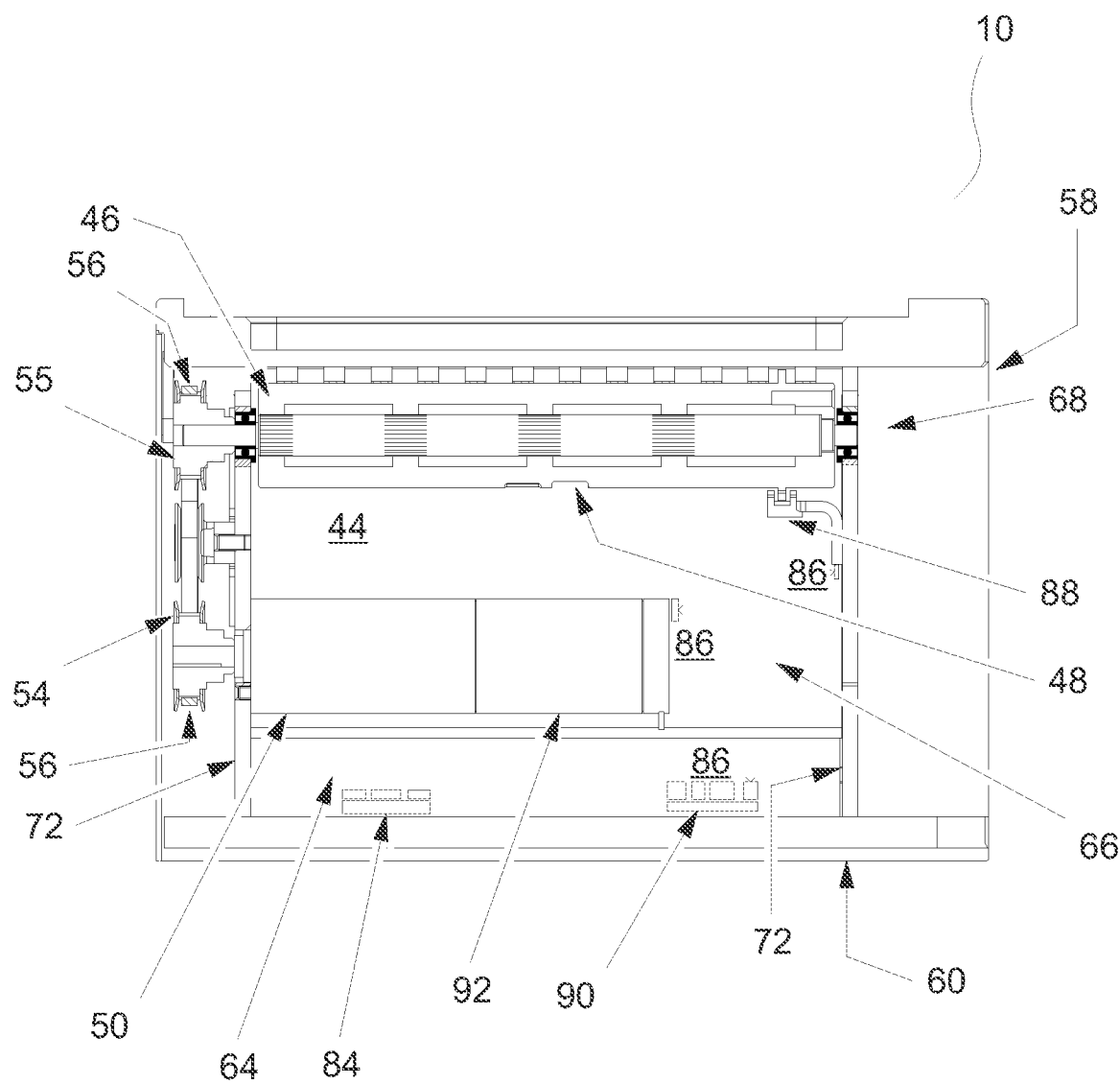
FIG. 5 shows a schematic representation of sample-handling-module showing various devices arranged within the housing.

FIG. 5 is a schematic representation of various devices arranged within the sample-handling-module (10). Housing (58) is envisaged as having a lower portion (64) located closest to the base plate (60), a central portion (66) located immediately above the lower portion (64), and an upper portion (68) located immediately above the middle portion (66) and closest to the top cover (76). Sensitive electronics (84) for powering and controlling the sample-handling-module (10) are positioned in the lower portion (64). The actuating device (44), specifically, the prime-mover (50) in the form of an electric motor is positioned in the middle portion (66). Holding device (20) and supporting device (30) are positioned in the upper portion (68). The actuating device (44) further comprises a pair of shafts (46, 46) configured to be operated in tandem. Each shaft (46) contains plurality of eccentric profiles (48). The eccentric profiles (48) are provided along a discontinuous helical pitch on the surface of the shaft (46). In an exemplary embodiment of the present invention, the eccentric profiles (48) are configured as depressions. The shafts (46, 46) are arranged parallel to each other and positioned beneath the array of tines (32) such that the shafts (46, 46) remain in surface-to-surface contact at all times with the contacting portions (42) of the tines (34). The shafts (46, 46) are arranged to rotate freely about their axes by supporting them on the mounting plates (72). A skilled person will recognize the need to provide additional rotation enabling elements such as bearings at suitable positions on the shafts (46, 46) for effecting smoother rotation. Driven pulley (55, 55) is connected to one end of each shaft (46, 46). A drive pulley (54) is directly coupled to the prime-mover (50). An endless belt (56) connects the drive pulley (54) and the driven pulley (55, 55), thus facilitating simultaneous transfer of power to shafts (46, 46) for rotating them about their axes in tandem.

Figure 6A:
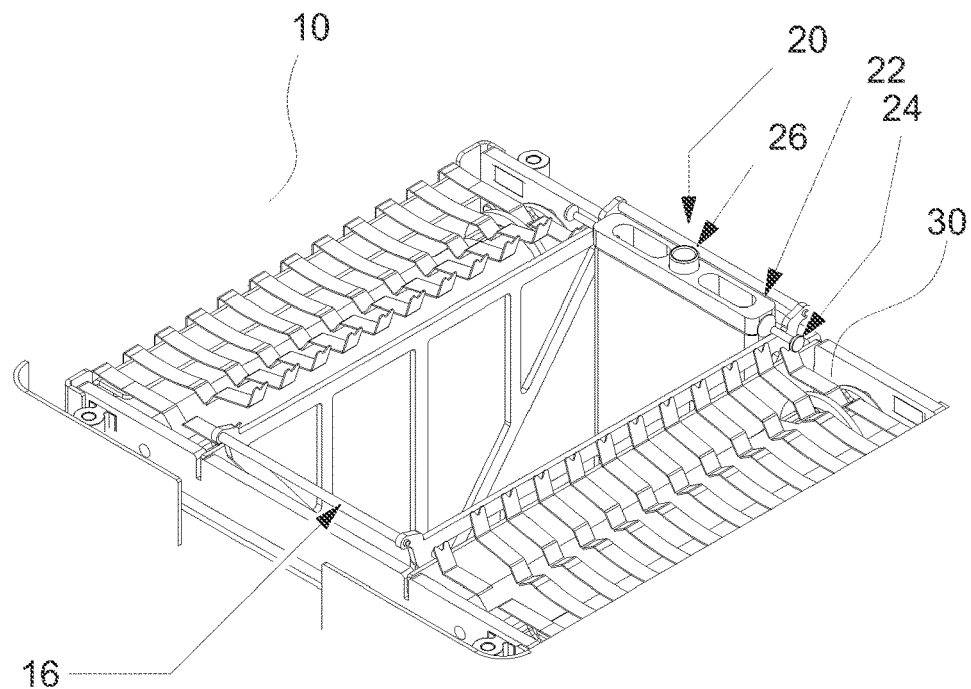
FIG. 6A shows a perspective view of the holding device, supporting device, and the load receiver of the apparatus.
Figure 6B:
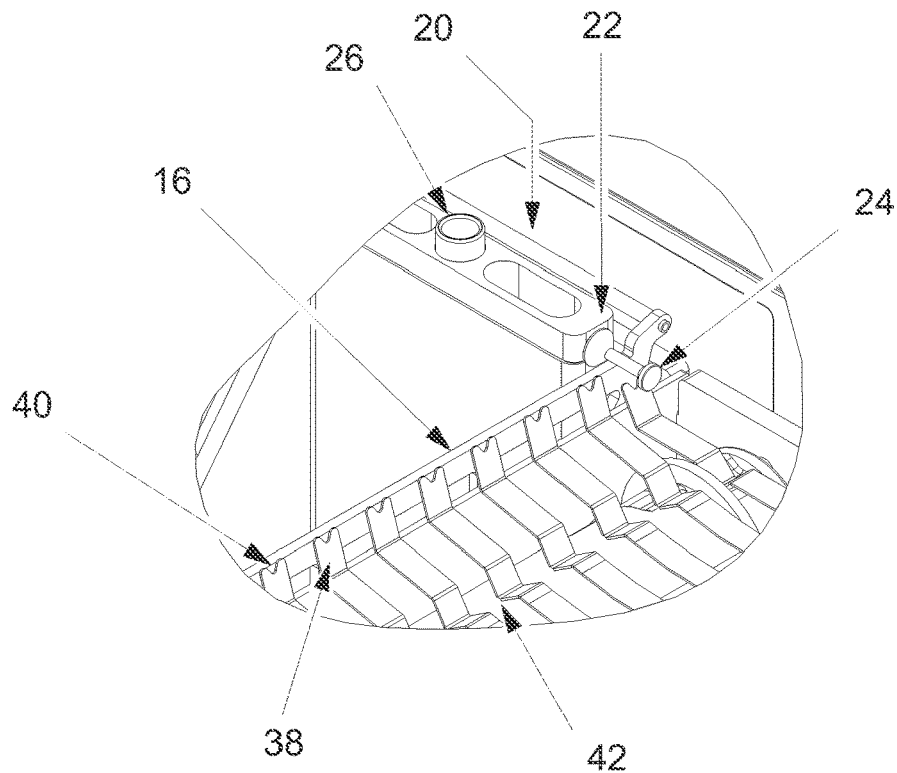
FIG. 6B shows a magnified view of a portion shown in FIG. 6A for demonstrating interaction between the holder and the load receiver of the weighing device.

FIG. 6A shows a perspective view of the holding device (20), supporting device (30), and the load receiver (16) of the apparatus (1). FIG. 6B shows a magnified view of a portion shown in FIG. 6A for demonstrating the interaction between the holder (22) and the load receiver (16) of the weighing device (11). In the instant drawings only a single holder (22) is shown for the sake of simplicity as well as to make the drawings less cluttersome. The representative embodiment of the invention described here is one that is suitable to be used with a liquid handling device containing 12 channels. Accordingly, the number of receptacles (26), the number of holders (22), the number of tines (34) in each array of tines (32), and finally the number of eccentric profiles (48) on each shaft (46) correspond to the number of channels in a liquid handling device that is the subject of calibration. The holding device (20) further comprises a pair of pins (24, 24) attached laterally to the holder (22) and extending outwardly thereof.

Figure 7:
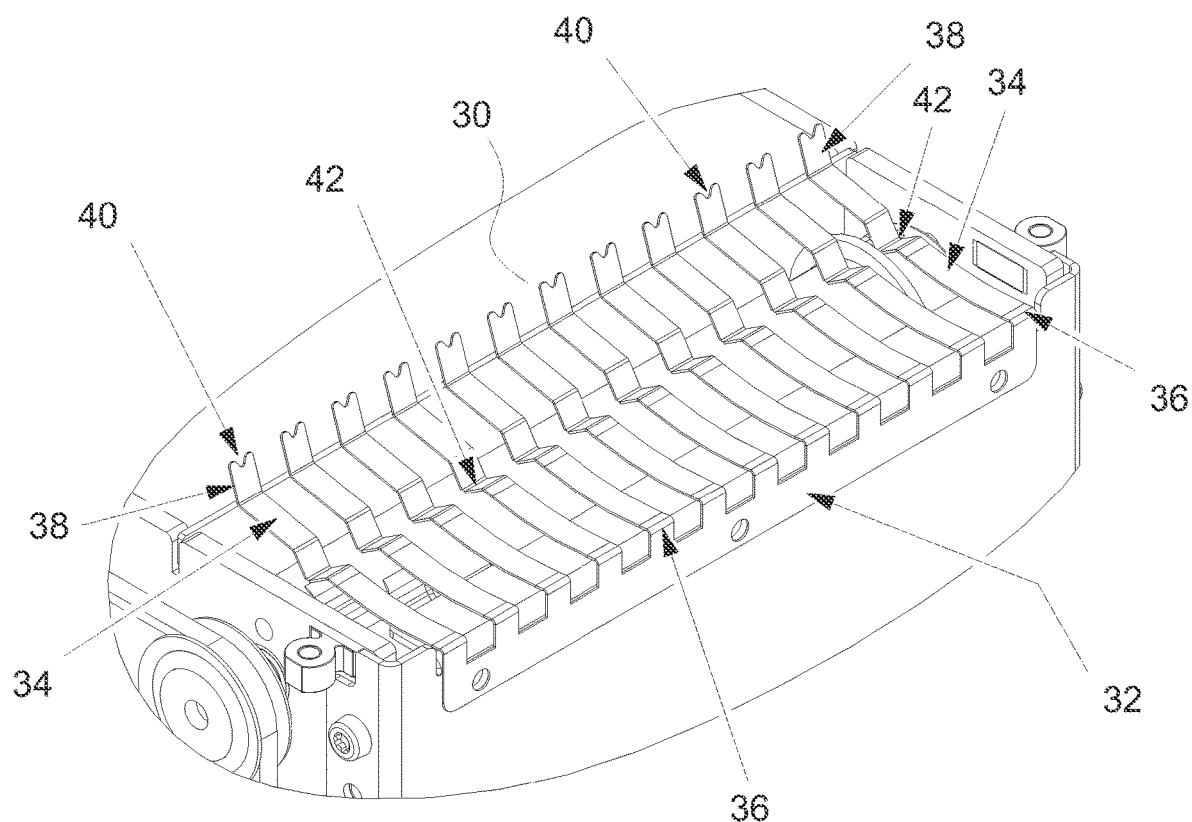
FIG. 7 shows a magnified view of the supporting device having an array of tines.

FIG. 7 shows a magnified view of the supporting device having an array of tines. The free-end (36) of each tine (34) in the supporting device (30) extends upwardly and comprises a notch (40). When the holder (22) is not mounted on the load receiver (16), the pin (24) extending outwardly from the holder (22) is perfectly received in the notch (40).

Figure 8:
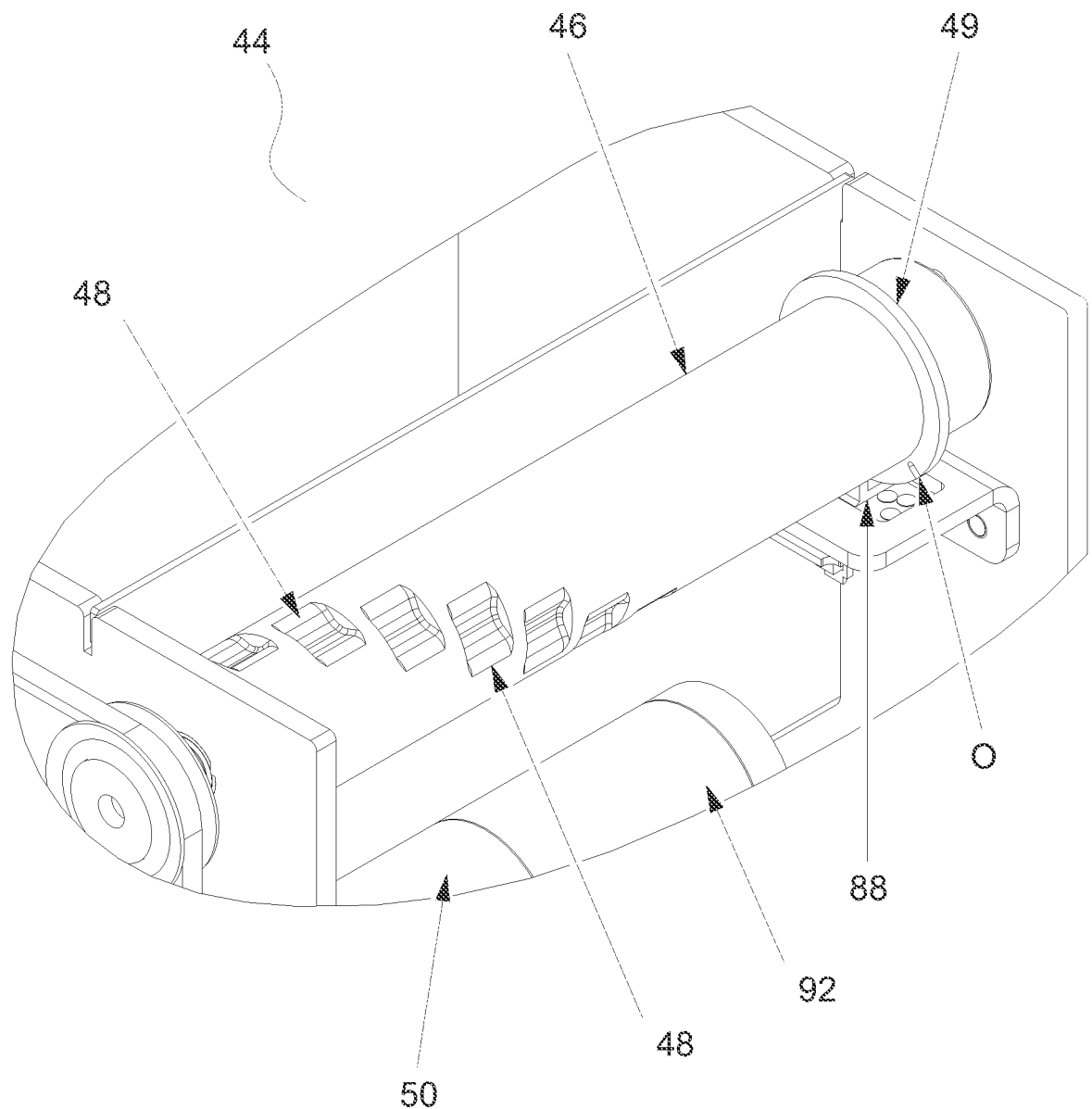
FIG. 8 shows a perspective view of the actuating device having a shaft with eccentric profiles and a light barrier.

FIG. 8 shows a perspective view of the actuating device (44) and specifically, of the shaft (46). As shown in the figure, the shaft (46) comprises eccentric profiles (48) provided along a discontinuous helical pitch. The eccentric profiles (48) are configured as depressions and are arranged in the housing (58) to interact with the contacting portions (42) of the corresponding tines (34). At least one of the shafts (46) contains a light-barrier (49) in the form of a ring-like shoulder arranged along the outer circumference of the shaft (46). The light-barrier (49) aids in determining the functioning of the actuating element (44).

Another aspect of the present invention is a system for operating the actuating device (44) of the sample-handling-module (10). As represented further in FIG. 5 and FIG. 8, the system contains an actuating device (44), a communication interface (86), a sensing element (88), a processing element (90), and an encoding element (92). The actuating device (44), particularly its shaft (46), is configured to function according to a predetermined operating cycle. The predetermined operating cycle comprises an operational condition and a terminal condition. Each operating cycle generates a series of weighing events that matches in count with the number of eccentric profiles (48) per shaft (46). A near-full rotation of the shaft (46) of the actuating device (44) constitutes a predetermined operating cycle. The operational condition and the terminal condition simply represents the operating states of the actuating device (44). In the present embodiment, the consequence of completing a predetermined operating cycle is the determination of weights of the test liquid in all the receptacles (26), one after the other, in a sequence. The sensing element (88) in the present embodiment is a light-barrier-sensor that is set to generate a signal when the light-barrier (49) on the shaft (46) allows the travel of light from the generating side to the receiving side of the sensing element (88). The opening (O) provided on the light-barrier (49) breaks the barrier for light transmission causing the predetermined operating cycle to reach a terminal condition. As soon as the position of the opening (O) on the light-barrier (49) synchronizes with the sensing element (88), the prime-mover (50) is powered-off thus stopping the rotation of the shafts (46, 46), instantly. The encoding element (92) is a rotary encoder attached to the prime-mover (50) and tasked with generating pulses that are representative of the disposition of the actuating device (44), specifically, the angular displacement ($\theta$) of the shaft (46). The pulses from the encoding element (92) are processed by the processing element (90) for determining the exact holder (22) and thereby the receptacle (26) that is mounted on the load receiver (16). The gravimetric weight value of the test liquid in the given receptacle (26) is measured by the weighing device (11), while the receptacle (26) carrying the test liquid is identified based on the pulses emanating from the encoding element (92). In this manner, the processing element (90) matches the weight value of the test liquid generated using the weighing device (11) to the receptacle (26) carrying it. Each eccentric profile (48) on the surface of the shaft (46) is responsible for a unique weighing event within the predetermined operating cycle. The mounting of the holder (22) carrying a receptacle (26) on to the load receiver (16) and its subsequent dismounting thereof resulting in the determination of weight of the test liquid in the receptacle (26) constitutes a single weighing event. In the instant example, the system is envisaged to generate twelve weighing events within a predetermined operating cycle of the actuating device (44). The communication interface (86) is a wired or wireless network that creates a closed-loop signal exchange mechanism among various elements of the system.

Figure 9:
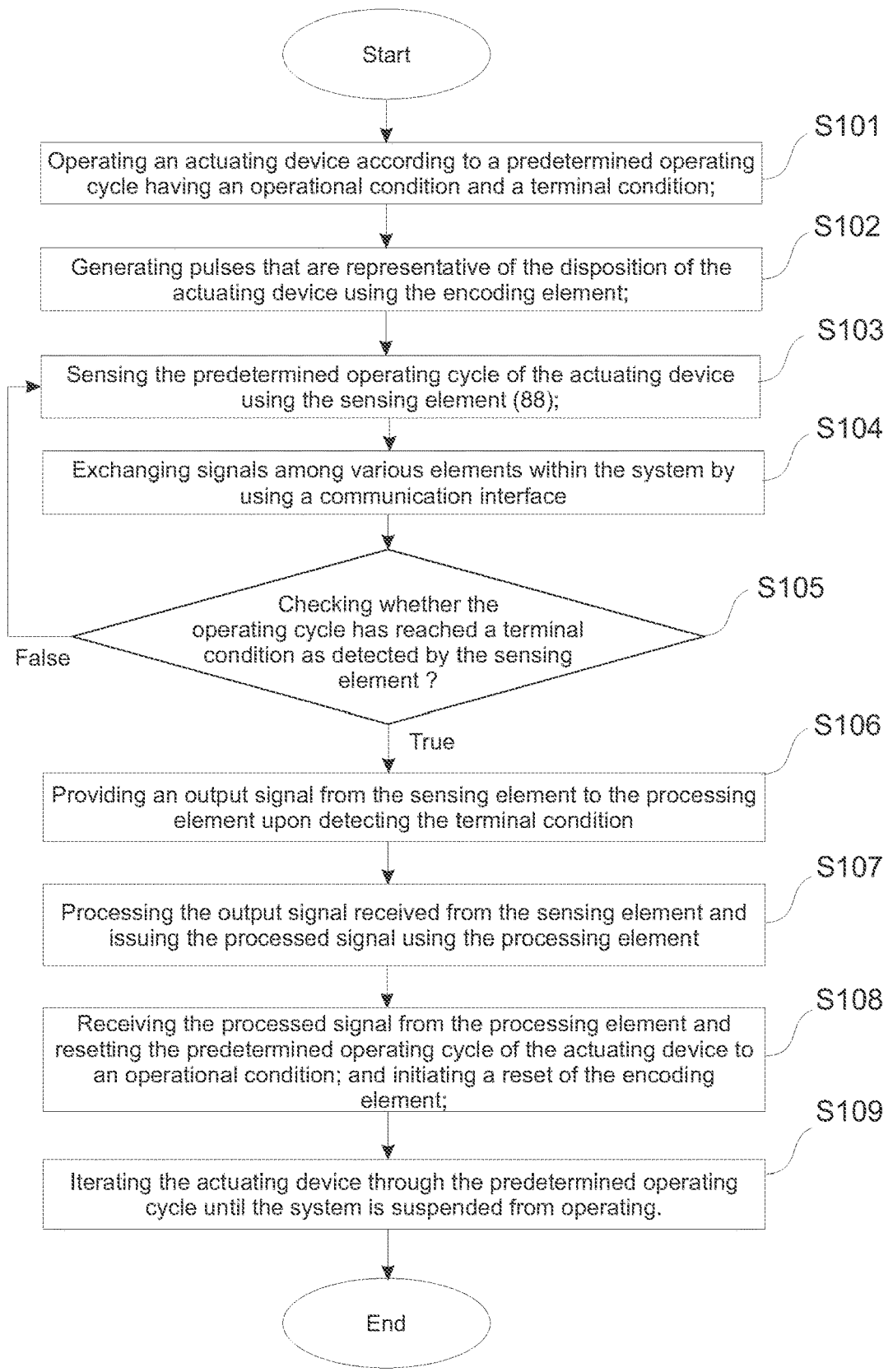
FIG. 9 is a representation of steps in a method of operating the actuating device of the apparatus.

In line with the system for operating the actuating device (44), a related aspect of the present invention is a method of operating the actuating device (44) comprising steps S101-S109 shown in FIG. 9. The method comprises step S101 in which the actuating device (44) is operated according to a predetermined operating cycle comprising operational condition and terminal condition. As described earlier, the operational condition and the terminal condition simply represent the operating states of the actuating device (44). In step S102, pulses representing the disposition of actuating device (44) are generated using the encoding element (92). The encoding element (92) coupled to the prime-mover (50) generates a feedback signal in the form of a pulse. In step S103, the condition of the predetermined operating cycle of the actuating device (44) is continuously sensed using the sensing element (88). The sensing element (88) in the present embodiment is a light-barrier-sensor that is disposed inside the housing (58) to generate a signal when the light-barrier (49) on the shaft (46) allows the travel of light from the generating side to the receiving side of the sensing element (88). In step S104, signals representing the condition of the predetermined operating cycle as well as the pulses from the encoding element (92) are exchanged with the processing element (90) using the communication interface (86). In step S105, a check is performed by the sensing element (88) to determine whether the predetermined operating cycle has reached a terminal condition. The predetermined operating cycle reaches a terminal condition when the opening (O) provided on the light-barrier (49) breaks the barrier for light transmission causing the predetermined operating cycle to reach a terminal condition. The method enters step S106, when the predetermined operating cycle reaches a terminal condition, thus causing the sensing element (88) to output a signal to the processing element (90). In step S107, the output signal from the sensing element (88) is processed and the processing element (90) issues a processed signal. As soon as the position of the opening (O) on the light-barrier (49) synchronizes with the sensing element (88), the prime-mover (50) is powered-off thus stopping the rotation of the shafts (46, 46) instantly. In step S108, the processed signal from the processing element (90) resets the predetermined operating cycle of the actuating device (44) to an operational condition; and also simultaneously initiates a reset of the encoding element (92). Step S109 is an iterative step in which the actuating device (44) is iterated through the predetermined operating cycle until the system is suspended from operating.

The working of the apparatus (1) will hereinafter be explained with specific reference once again to FIGS. 1-9. Firstly, the apparatus (1) is set up by attaching the sample-handling-module (10) to the weighing device (11). The setup is successful when the base plate (60) of the module (10) perfectly interlocks with the pegs (14) on the platform (12) while the load receiver (16) of the weighing device (11) is fully received in the space formed by the longitudinal separators (70) and the mounting plates (72). For representational purpose, the configuration of the apparatus (1) as shown in FIG. 1 indicates a successful set up. The top cover (76) is removed and the evaporation wells are filled with water in order to maintain the required relative humidity within the apparatus (1). The holders (22) carrying the receptacles (26) are arranged sequentially within the confines of the load receiver (16). Each holder (22) is supported laterally by the corresponding tine pair (34) securely receiving the pins (24) into the notches (40). In the instant example, the holding device (20) has twelve holders (22) each carrying one receptacle (26). The top cover (76) is put back into its designated location and its shutter (80) is opened manually to gain targeted access to the receptacles (26). The multi-channel liquid handling device, designated for calibration, is first used for aspirating the test liquid (water). The multi-channel liquid handling device is brought closer to the shutter (80) that is now open, and the test liquid (water) is then dispensed into the exposed receptacles (26) before closing the shutter (80) quickly. Each receptacle (26) corresponds to a channel of a multi-channel liquid handling device. The actuating device (44) is operated using the system and the method described previously. The supporting device (30) acts as a go-between for the holding device (20) and the actuating device (44). When the predetermined operating cycle of the actuating device (44) is in operational condition, the shafts (46, 46) rotate in tandem. The contacting portions (42, 42) of the given pair of tines (34, 34) closely trace the surfaces of the shafts (46, 46). When the contacting portions (42, 42) interact with the eccentric profiles (48, 48) on the shafts (46, 46), the free ends (38, 38) of the tines (34, 34) tend to be downwardly directed during the first half of their traversal along the depression of the eccentric profiles (48, 48), thus mounting the given holder (22) carrying the receptacle (26) on to the load receiver (16). As soon as the holder (22) is mounted on to the load receiver (16), the load cell generates a signal indicative of the weight of test liquid in the given receptacle (26), thus recording the first weighing event. The receptacle (26) that is currently weighed is identified using the signal generated by the encoder (92) attached to the prime-mover (50). As the shafts (46, 46) continue their rotation, the free ends (38, 38) of the tines (34, 34) now reverse their direction and tend to be upwardly directed during the second half of their traversal along the remaining portion of the eccentric profiles (48, 48), thus unmounting the given holder (22) carrying the receptacle (26) from the load receiver (16). The eccentric profiles (48) on the shaft (46) follow a discontinuous helical pitch, as shown in FIG. 8, allowing for an overlap between consecutive eccentric profiles (48). The actuating device (44) continues its operation following the predetermined operating cycle and generates a series of weighing events that correspond to the weight values of test liquid in each receptacle (26). Once the opening (O) on the light barrier (49) synchronizes with the sensing element (88), the prime-mover (50) is powered-off thus stopping the rotation of the shafts (46, 46), instantly. Each weighing event generates two data points: the receptacle (26) that identifies the channel number of the multi-channel liquid handling device from which the test liquid (water) is dispensed, and the weight value of the test liquid (water) in the corresponding receptacle (26). These data points in the form of a key-value pair are transferred in to a data acquisition program, in real time. The calibration software utilizes this acquired data for determining systematic error and random error, both at channel level. The process is repeated by gradually increasing the volumes (e.g. 20 μl, 100 μl, 200 μl) of the test liquid (water) dispensed into the receptacles (26).

While the invention has been described through the presentation of a specific embodiment of a sample-handling-module, it is considered self-evident that numerous additional variants are encompassed by the teachings of the present invention. It is envisaged to use the teachings of the present invention and carry out predictable modifications that does not alter the underlying functionality. One such modification is altering the basic constitution and structural features of holding device and supporting device. Another conceivable modification is to configure the sensing element to generate a signal upon detecting a barrier. Such variants of the present concept described and claimed herein are considered without exception to fall within the scope of protection that is here by sought for the present invention.

REFERENCE SIGNS LIST apparatus 1
sample handling module 10
weighing device 11
platform 12
pegs 14
load receiver 16
force transmitting link 18
holding device 20
holders 22
pins 24
receptacles 26
supporting device 30
array of tines 32
tine 34
fixed end 36
free end 38
notch 40
contacting portion 42
actuating device 44
shafts 46
eccentric profiles 48
light-barrier 49
prime-mover 50
drive elements 52
drive pulley 54
driven pulley 55, 55
unending belt 56
housing 58
base plate 60
load-bearing walls 62
lower portion 64
middle portion 66
upper portion 68
longitudinal separators 70
mounting plates 72
outer cover 74
top cover 76
opening 78
shutter 80
sensitive electronics 84
communication interface 86
sensing element 88
processing element 90
encoding element 92
opening in light-barrier O (49)

What is claimed is:

1. A sample-handling-module that cooperates with a weighing device having a load receiver, for calibrating a multi-channel liquid handling device, the sample-handling-module comprising:
   a holding device comprising a plurality of holders, arranged sequentially and spaced equally apart equally from each other, each holder configured to receive a receptacle;
   a supporting device comprising an array of tines that provide lateral support to the holders when the holders dismount from the load receiver; and
   an actuating device, comprising a pair of shafts, operable in tandem, with each shaft comprising a plurality of eccentric profiles provided along a discontinuous helical path to operatively interconnect the plurality of holders through the array of tines, such that the actuating device is arranged to, when operated, mount the holders, one at a time, onto the load receiver by disengaging the corresponding tines that support the holder being mounted.

2. The module of claim 1, wherein each tine in the array of tines is configured as a pliable finger comprising:
   an immovable fixed-end;
   a free-end; and
   a contacting portion located between the fixed-end and the free-end.

3. The module of claim 2, wherein:
   the free-end of each tine extends upwardly and comprises a notch for laterally engaging one of the holders when the holder is dismounted from the load receiver.

4. The module of claim 3, further comprising:
   a pair of pins, as a part of the holding device, the pins attached laterally to the holder and extending outwardly therefrom,
   wherein the pins interact with the load receiver when the corresponding holder is mounted onto the load receiver and the pins interact with the notch of the corresponding tines when the corresponding holder is unmounted from the load receiver.

5. The module of claim 1, wherein the eccentric profiles are configured as depressions.

6. The module of claim 1, wherein the shafts are arranged parallel to each other and are positioned beneath the array of tines such that the shafts remain in surface-to-surface contact at all times with the contacting portions of the tines.

7. The module of claim 1, further comprising:
   a prime-mover, such as a motor, as a part of the actuating device for providing motive force to drive the pair of shafts.

8. The module of claim 1, further comprising:
   drive elements, as a part of the actuating device, to operate the pair of shafts in tandem upon application of motive force through the prime-mover.

9. The module of claim 1, further comprising:
   a housing, in which the holding device, the supporting device, and the actuating device are enclosed, the housing having a base plate; and
   a platform of the weighing device, to which the base plate is attached.

10. The module of claim 9, further comprising:
    longitudinal separators of the housing, arranged parallel to each other and positioned on either side of the holding device so as to separate the holding device from the actuating device;

mounting plates of the housing, arranged perpendicular to the longitudinal separators for mounting the actuating device; and a top cover of the housing, the top cover comprising an opening, a shutter that secures the top cover, and evaporation wells;

wherein the longitudinal separators, the mounting plates, and the top cover co-act to shield a test-liquid contained in the receptacles from adverse influences.

11. The module of claim 10, further comprising:

a lower portion of the housing, located closest to the base plate, having sensitive electronics for powering and controlling the module are positioned therein;

a central portion of the housing, located immediately above the lower portion of the housing, having the actuating device positioned therein; and an upper portion of the housing, located immediately above the central portion of the housing and closest to the top cover, having the holding device and the supporting device positioned therein.

12. An apparatus for calibrating a multi-channel liquid handling device, the apparatus comprising:

a weighing device having a load receiver; and a sample-handling-module according to claim 1.

13. A system for operating a sample-handling-module that cooperates with a weighing device having a load receiver, for calibrating a multi-channel liquid handling device, the system comprising:

the sample-handling-module according to claim 1, wherein the actuating device is configured to function according to a predetermined operating cycle that comprises an operational condition and a terminal condition;

a communication interface, configured to facilitate an exchange of signals among various elements within the system;

a sensing element, configured to:
   sense the predetermined operating cycle of the actuating device;
   detect whether the operating cycle has reached a terminal condition, and
   provide an output signal upon detecting the terminal condition;

a processing element, configured to process the output signal indicative of the terminal condition and issue a processed signal; and an encoding element, configured to generate pulses representative of a disposition of the actuating device and to initiate a reset when the predetermined operating cycle of the actuating device reaches a terminal condition;

whereby the actuating device iterates through the predetermined operating cycle until the system is suspended from operating.

14. A method for operating an actuating device, the method comprising the steps of:

providing the system of claim 13;

operating the actuating device according to the predetermined operating cycle, wherein the predetermined operating cycle comprises the operational condition and the terminal condition;

generating pulses representative of disposition of the actuating device using the encoding element;

sensing the predetermined operating cycle of the actuating device using the sensing element;

exchanging signals among various elements within the system using the communication interface;

checking whether the operating cycle has reached a terminal condition as detected by the sensing element;

providing the output signal from the sensing element to the processing element upon detecting the terminal condition;

processing the output signal received from the sensing element and issuing the processed signal using the processing element;

receiving the processed signal from the processing element and resetting the predetermined operating cycle of the actuating device to the operational condition; and initiating a reset of the encoding element; and iterating the actuating device through the predetermined operating cycle until the system is suspended from operating.

* * * * *